May 26, 1970      G. E. DAVIES ET AL      3,514,138
BALL JOINT ASSEMBLY
Filed Aug. 16, 1965      5 Sheets-Sheet 1
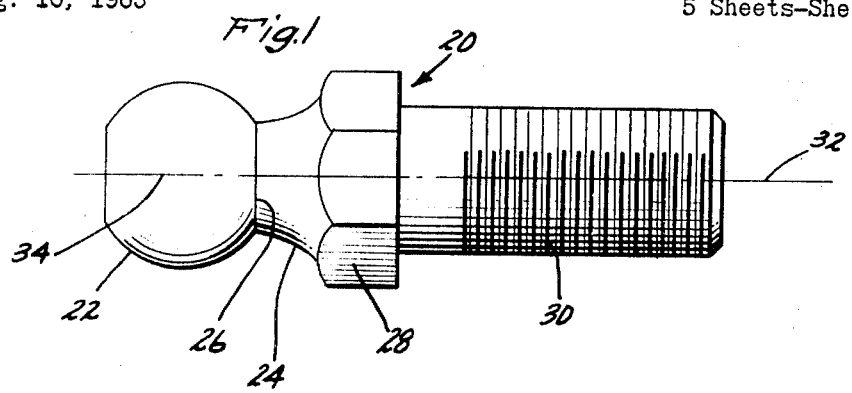
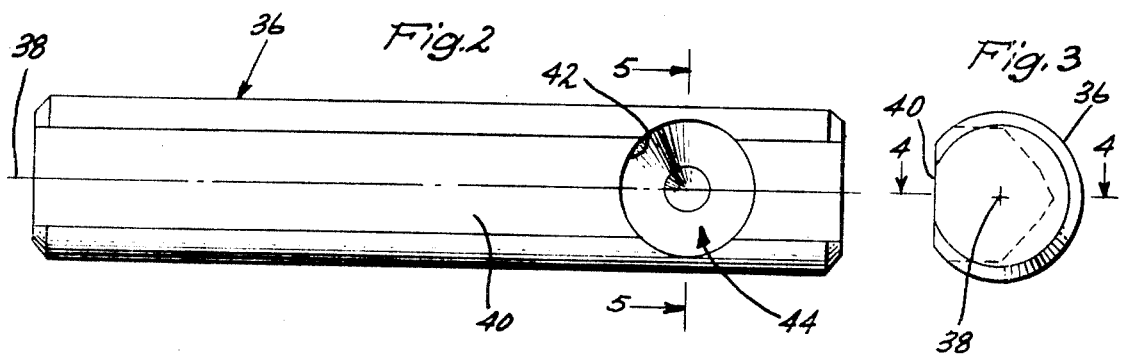
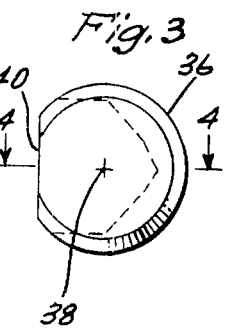
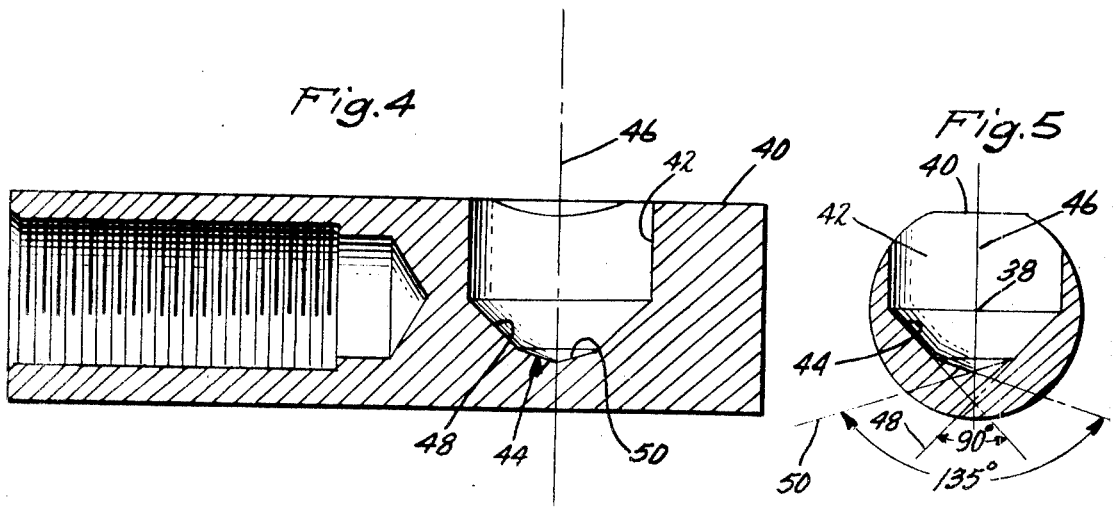
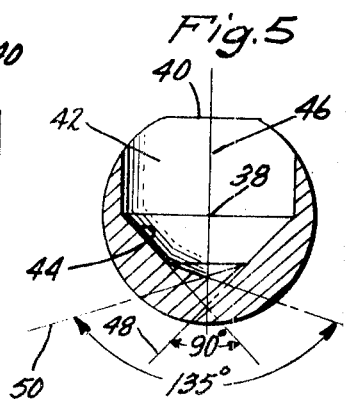
INVENTORS:
Gilbert E. Davies,
John M. Weston,
BY Gino L. Gasparini,
Hood, Gust & Irish
Attorneys.

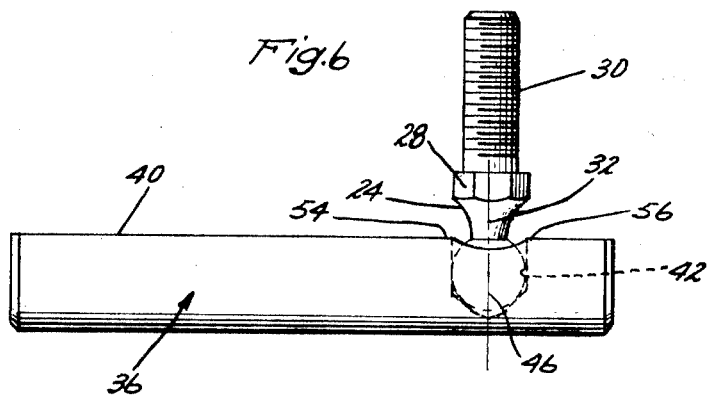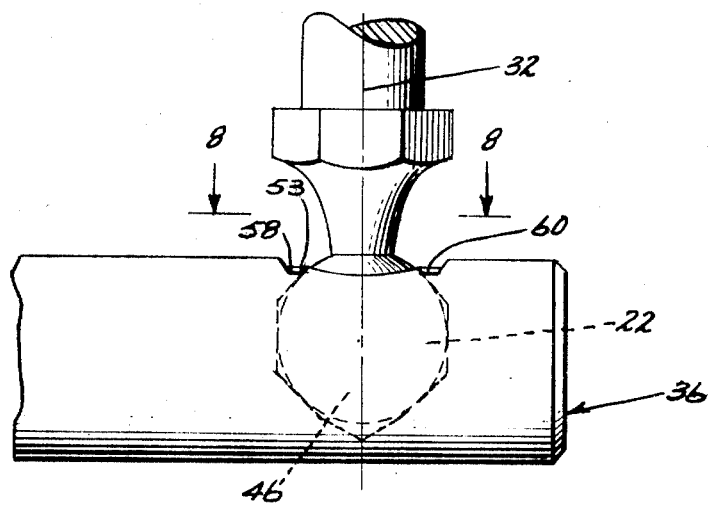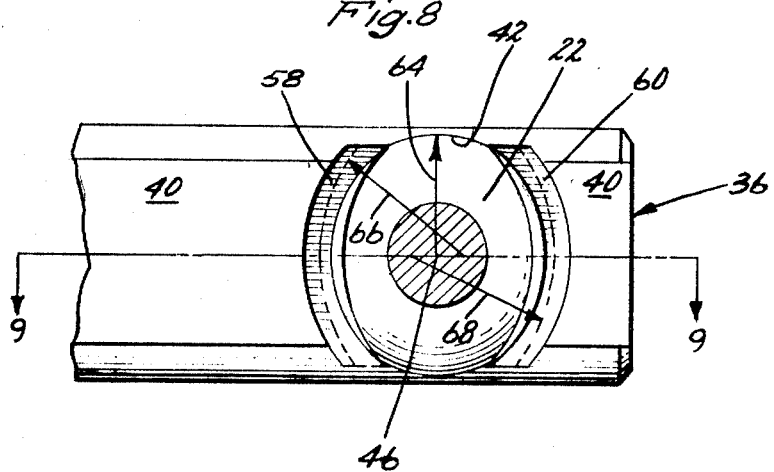

INVENTORS:
Gilbert E. Davies,
John M. Weston,
Gino L. Gasparini,
Hood, Gust & Irish
Attorneys.

May 26, 1970 G. E. DAVIES ET AL 3,514,138
BALL JOINT ASSEMBLY
Filed Aug. 16, 1965 5 Sheets-Sheet 4
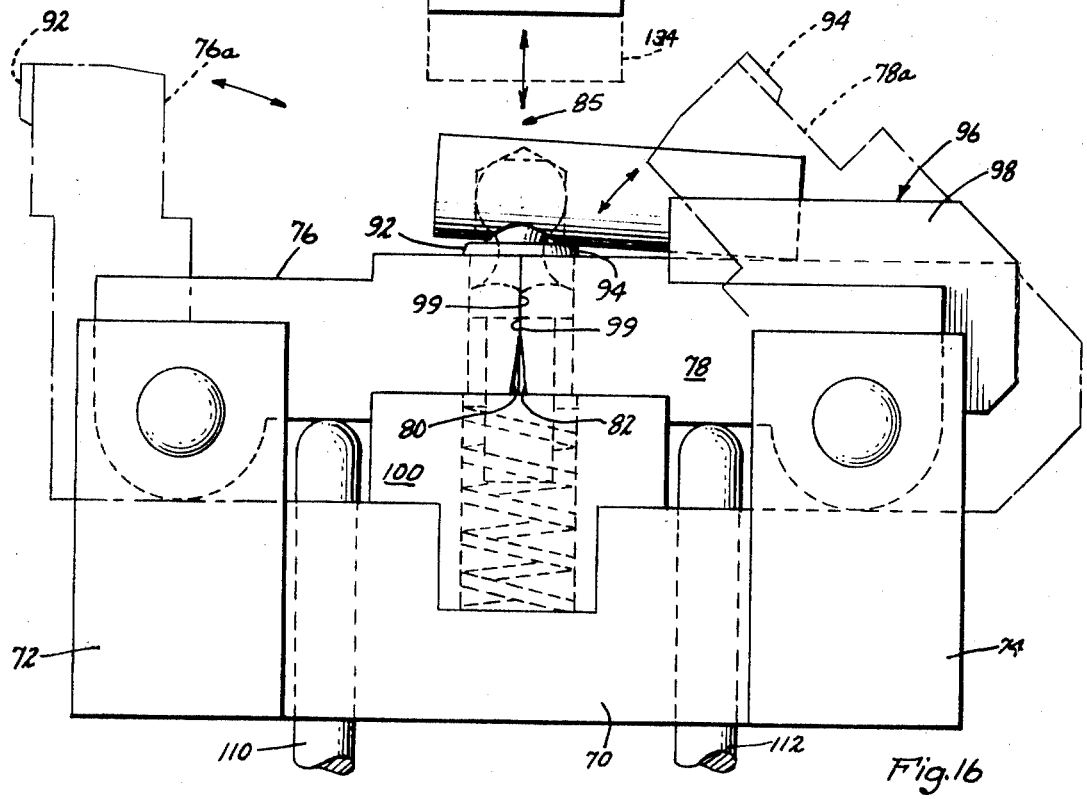
Fig.11
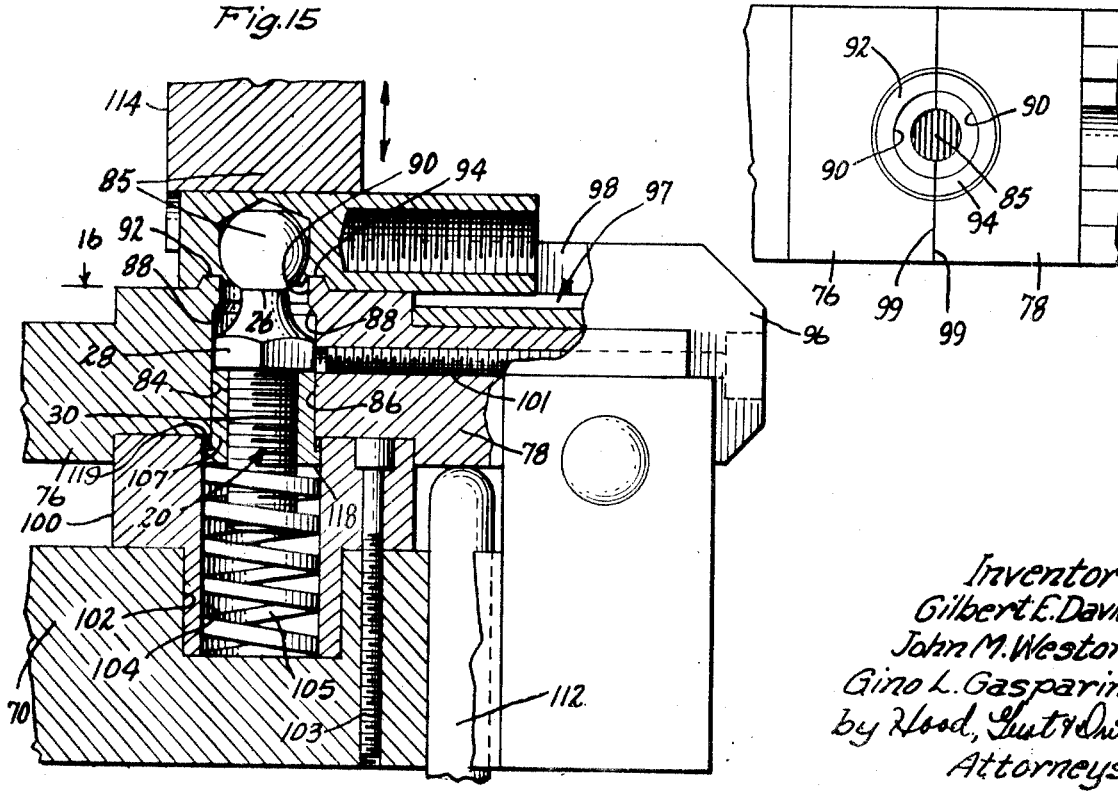
Fig.15
Fig.16
Inventors:
Gilbert E. Davies,
John M. Weston,
Gino L. Gasparini,
by Hood, Gust & Irish
Attorneys.

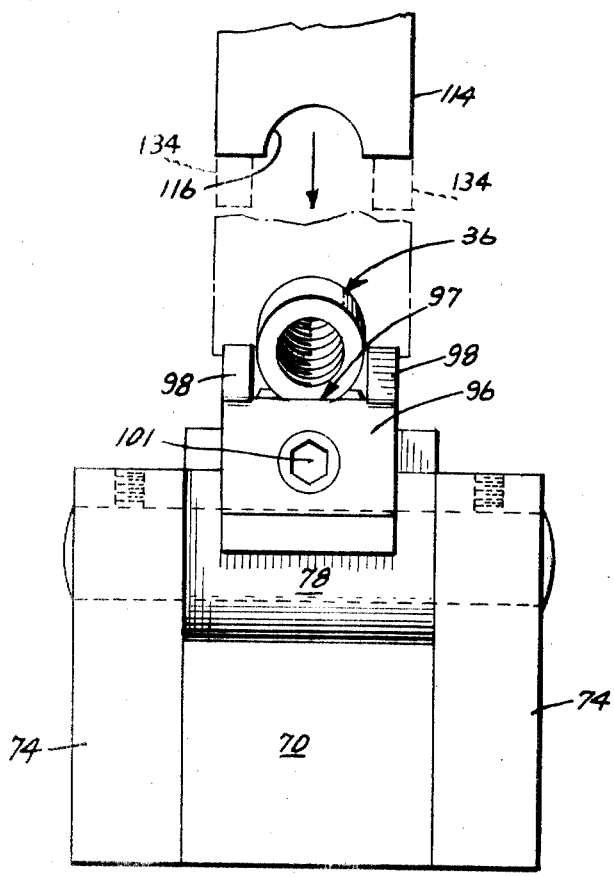
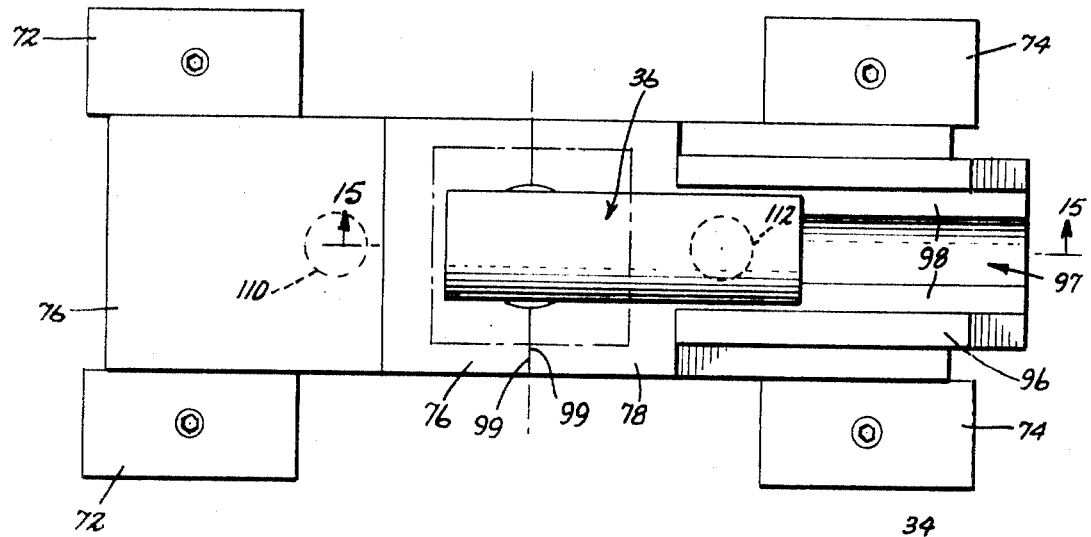
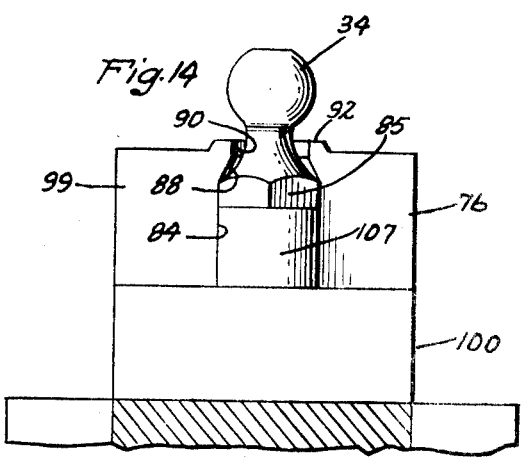
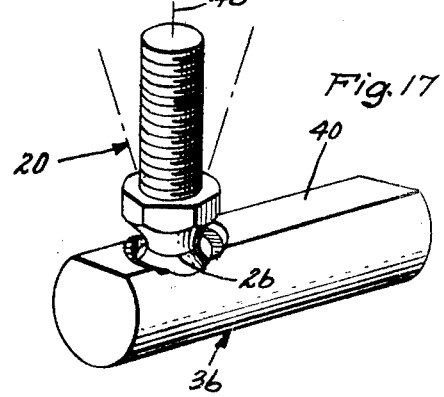

United States Patent Office 3,514,138
Patented May 26, 1970

1

3,514,138
BALL JOINT ASSEMBLY
Gilbert E. Davies, John M. Weston, and Gino L. Gasparini, Fort Wayne, Ind., assignors, by mesne assignments, to Tuthill Pump Company, a corporation of Delaware
Filed Aug. 16, 1965, Ser. No. 479,860
Int. Cl. F16c 11/06
U.S. Cl. 287—90                                    6 Claims

ABSTRACT OF THE DISCLOSURE

The present invention relates to a ball joint assembly wherein the socket element comprises a cylindrical body provided with a flat side having a socket bore therein which bore has an open end intersecting the flat side and part of the cylindrical body portion. Opposite sides of the socket opening along the axis of the cylinder are provided with coined indentations so as to deform metal of the bore wall inwardly against a ball stud located in the socket bore.

---

The present invention relates to a ball joint assembly.

In Davies application Pat. No. 3,253,845 issued May 31, 1966, there is disclosed a ball joint assembly composed of two parts, namely, a body member containing a socket and a ball stud having a ball on one end thereof which is received for swiveling movement by the socket. The body member is primarily cylindrical and the socket is formed concentric with the radius of the body. The ball is retained in the socket by staking opposite sides of the body adjacent to the socket for displacing metal inwardly around the ball. By reason of the geometries involved, and the particular construction, the angle of swiveling movement or tilt of the ball stud in the socket, the strength of the assembly, and the wear-life thereof are all determined.

The present invention constitutes a decided improvement over the arrangements disclosed or claimed in the aforesaid application in the respects of improving wear-life, improving strength, reducing manufacturing costs, increasing the angle of swiveling movement of the ball stud and the like.

It is yet another object of this invention to provide an improved ball joint assembly of increased strength as compared with prior assemblies of comparable size.

It is still another object of this invention to provide an improved ball joint assembly wherein the ball stud has a greater angle of swiveling movement for a given size and shape of ball stud and body.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side view of a typical ball stud of this invention;

FIG. 2 is a view of a body member having a socket drilled therein, this member representing one of the steps of the method in fabricating the ball joint assembly;

FIG. 3 is an end view of the body member of FIG. 2;

FIG. 4 is a longitudinal sectional view taken on section line 4—4 of FIG. 3;

FIG. 5 is a cross-sectional view taken substantially along the section line 5—5 of FIG. 2;

FIG. 6 is a side view showing another step in the method of fabricating the ball joint assembly of this invention;

FIG. 7 is a fragmentary side view of a finished ball joint assembly of this invention;

2

Figure 9:
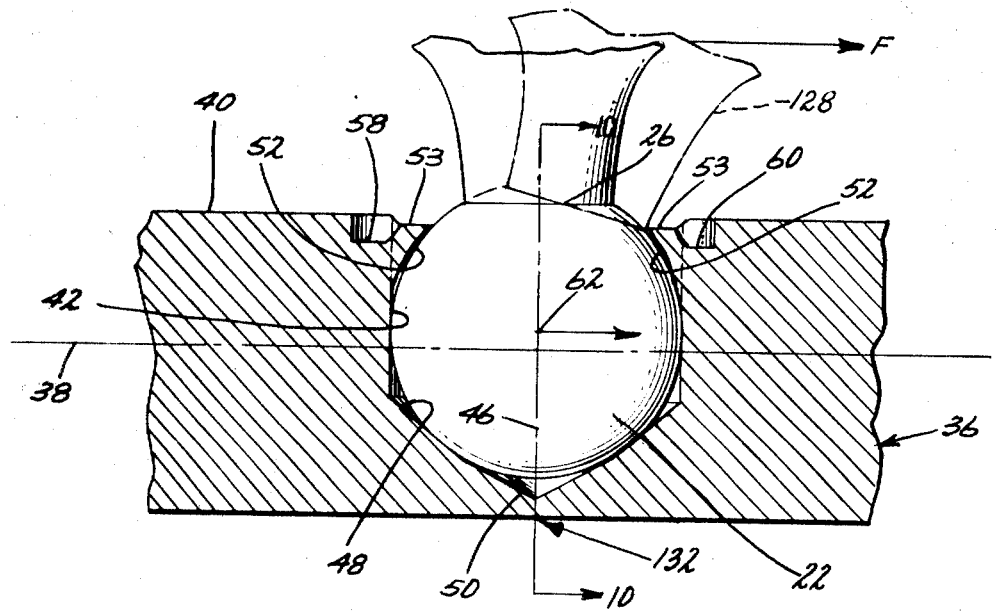
Figure 10:
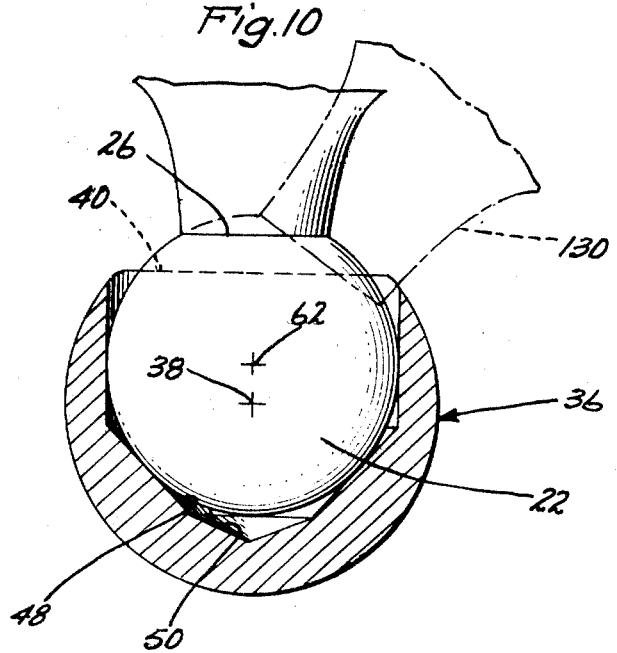

FIG. 8 is a fragmentary and sectioned view taken substantially along the section line 8—8 of FIG. 7;

FIG. 9 is a longitudinal sectional view, also fragmentary, enlarged for clarity of illustration, of the ball joint arrangement of the preceding FIGS. 7 and 8;

FIG. 10 is a partial cross-sectional view taken substantially along section line 10—10 of FIG. 9;

FIG. 11 is a side view of an embodiment of the apparatus of this invention;

FIG. 12 is a top plan view of the arrangement of FIG. 11;

FIG. 13 is an end view thereof with a ball joint assembly in position thereon;

FIG. 14 is an end view of only a single die piece with a ball stud in position for receiving a socket member;

FIG. 15 is a fragmentary, longitudinal sectional view taken substantially along section line 15—15 of FIG. 12;

FIG. 16 is a fragmentary top plan view of the two die pieces with a ball stud mounted therebetween, the latter being sectioned through the neck thereof at right angles to the axis; and FIG. 17 is a perspective illustration of the finished ball and socket assembly.

Referring to FIG. 1, a ball stud, indicated generally by the reference numeral 20, is provided on one end thereof with a generally spherical ball 22, and a reduced diameter neck 24 having a circular neck line or terminal neck portion 26 which joins the ball 22. A nut portion 28 is joined to the neck portion 24, and a shank 30 extends axially from the neck and nut portions 24 and 28, respectively. The ball stud 20 is an integral construction preferably formed of steel with the ball 22 being hardened. The axis 32 of the shank 30 is coincident with an extension of a diameter 34 of the ball 22 as shown.

In FIG. 2 is illustrated the body member, indicated by the reference numeral 36, of the ball joint assembly, which is part cylindrical in shape and is formed of non-hardened metal, such as steel, brass, aluminum and the like. The material of this body member 20 is deliberately chosen to be softer than the hardened ball 22. The cylindrical part of this member 36 is coaxial about an axis 38 while the side 40 thereof is flat and parallel to the axis 38. In one embodiment of this invention, the width dimension of this flat side 40 is between that of a radius and a diameter of the cylindrical portion of the body member 36. As shown in FIG. 3, the flat side 40 appears to be a chord of a circle defined by the cross-section of the body 36.

In the right-hand end of the body 36 is a cavity or socket 42 of generally cylindrical shape but having a gradually tapered bottom 44 (see FIG. 5). The axis 46 of the cavity 42, in the preferred embodiment of this invention, is normal to the axis 38 of the body 36. The cavity 42 preferably is formed by a simple drilling operation, the point of the drill, which usually is tapered, forming the bottom 44.

As shown more clearly in FIGS. 4 and 5, the bottom portion 44 is formed in two tapered sections, one section indicated by the numeral 48 having a 90° taper (FIG. 5) and the tip section 50 having a 135° taper. Both of these tapered sections 48 and 50 are concentric with the cavity axis 46.

The diameter of the cavity 42 is made slightly larger than the width of the flat side 40 of the body 36 as shown more clearly in FIG. 2. Also, this diameter is made just slightly larger than the largest diameter of the ball 22. The cavity 42 is, therefore, of such size that the ball 22 may be received therein for pivotal movement without looseness.

FIGS. 7, 8, 9 and 10 illustrate the ball 22 as being received by the body member 36, FIGS. 8 and 9 showing the cavity 42 deformed inwardly slightly to provide a part-spherical socket identified by the numeral 52 which substantially conforms to the shape of the upper portion of the ball 22. The method of deforming the cavity 42 so as to provide the contour just described will be explained more fully hereinafter. As shown in FIGS. 9 and 10, a slight clearance is provided between the wall of the socket 42, 52 and the ball 22 such that the latter may freely swivel therein.

The method of forming the part-spherical socket 52 will now be explained. In essence, metal is deformed from diametrically opposite portions of the body 36 adjacent to the cavity 42 so as to overlie portions of the upper surface of the ball 22 to prevent the latter from being withdrawn from the socket 52.

As shown in FIGS. 2, 3 and 6, the cavity axis 46 is not only perpendicular to the body axis 38 but also to the plane of the flat side 40. With the cavity 42 formed as shown in FIGS. 2, 3, 4 and 5, and the ball stud formed as already explained in connection with FIG. 1, the two parts are assembled as shown in FIG. 6. The ball 22 is inserted into the cavity 42 and the stud 20 is held in such position that the axis 32 thereof is coextensive with the cavity axis 46, such that the axis 32 is perpendicular to both the flat side 40 and the body axis 36.

With the body 36 and the ball stud 20 so held in position, diametrically opposite portions, indicated by the numerals 54 and 56, are coined so as to provide indentations 58 and 60, respectively. These indentations 58 and 60 are spaced apart in a direction axially of the body 36 such that the metal displaced by making the indentations 58 and 60 will be forced inwardly against the ball 22 as a backing thereby forming the part-spherical socket portions 53 (FIG. 9). Just enough coining force is used in making the arcuate indentations 58 and 60 that the ball 22 will not be frictionally bound in place and otherwise just the proper amount of clearance is provided for the ball 22 to swivel properly within the socket 42, 52.

As shown more clearly in FIG. 8, the arcuate extents of the two indentations 58 and 60 are longer than the width of the flat portion 40 so that the opposite end portions of the indentations enter into the rounded surface portions of body 36. Thus, it will appear that the indentations 58 and 60 are quite long in comparison to the width of the side 40 and thereby provide a substantial arcuate length of displaced material which forms the socket portion 52 and retains the ball 22 within the socket.

The coining operation, as previously explained, is performed on the flat side 40 at locations which are immediately adjacent to the perimeter of the socket 42 such that coining radially inwardly toward the axis 38 of the body will result in the metal being displaced radially inwardly against the ball 22 as a backing.

The ball and socket diameters as well as the dimensions of the body 36 are so selected that the center 62 of the ball 22 is positioned as closely as possible to the axis 38 when the ball 22 is seated onto the tapered bottom section 48 of the socket (FIGS. 4 and 5). FIGS. 9 and 10 illustrate this positioning in enlarged and exaggerated form to show the proximity of the ball center to the body axis. It may be stated at this point that by providing the flat side 40 of the body 36, the ball center 62 may be made to approach the body axis 38 more closely, for a given size of body 36, than any previous design has permitted. As will be explained later, this greatly increases the wear-life and tensile strength of the assembly, as well as tilt angle of the ball stud, all of these features being obtained in an arrangement which is no more expensive nor complicated than prior arrangements and, as a matter of fact, is less costly.

As shown in FIG. 8, the relationships between the radii and centers of curvature of the cavity 42 and the indentations 58 and 60 are indicated by the particular radii 64, 66 and 68. The two radii 66 and 68 indicate the curvatures of the midlines of the indentations 58 and 60 while the radius 64 indicates the curvature of the cavity 42. The centers of the two radii 66 and 68 are offset to opposite sides of the socket axis 46 in a direction axially of the body 36 as shown. While this geometric illustration indicates one design of this invention, it should be understood that this geometry may be varied slightly without departing from the spirit and scope of this invention. The variations will become apparent from the explanations that follow.

The coining operations described in the foregoing are preferably performed by the apparatus illustrated in FIGS. 11 through 16. This apparatus comprises a base plate 70 having a first pair of lugs 72 secured to and upstanding from the left-hand end of the plate 70 as shown, and a second pair 74 secured to and upstanding from the right-hand end thereof. Two elongated punch members 76 and 78 are hingedly secured to the lugs 72 and 74 as shown for swinging movement inwardly to ward each other from the full-line positions of FIG. 11 to the open, dashed-line positions 76a and 78a as shown. In this closed position, the punch members or blocks 76, 78 are substantially horizontal and in alignment with the ends thereof contiguous. The individual blocks 76 and 78 are substantially rectangular and preferably are made of steel. The facing ends thereof are inclined as indicated by the numerals 80 and 82 and in these ends are formed two semi-cylindrical recesses 84 and 86 which are coaxial about a common vertical axis 85 when the blocks are in the full-line position 76, 78. The upper portions of these recesses 84 and 86 are provided with inwardly angled shoulders 88 from which extend upwardly the smaller radiused portions 90 which are also coaxial about the axis 85.

Immediately above the curved portions 90 and constituting upward extensions thereof are punch edges 92 and 94 of semi-circular shape. These punch edges are concentric about the axis 85 and together form a substantially complete circle. The inner surfaces of these punch edges 92 and 94 are coextensive with the cylindrical portions 90. This is more clearly illustrated in FIG. 16 which shows the upper sides of the two members 76, 78 in the "down" or closed position (see FIGS. 11, 12 and 16).

Secured to the upper side of the punch member 78 is a matrix block 96 having an elongated nest 97 defined by two spaced parallel sides 98. The axis of this nest 97 extends parallel to the longitudinal axis of the base plate 70 and preferably is horizontal. A bolt 101 passing through both the block 96 and punch 78 secures the two together. Also, this axis lies in an upright plane, preferably, which includes the axis 85. The contiguous edges 99 of the punch blocks 76 and 78 when in the full line position of FIG. 11 extend parallel to this vertical plane.

A cylindrically shaped backing block 100 is snugly fitted into a socket 102 in the base plate 70 as shown, and is secured to the latter by means of a bolt 103. An upright cylindrical bore 104 in the block 100 is coaxial with respect to axis 85, and receives a helical compression spring 105. A centering sleeve 107 is telescopically fitted into the bore 104 and rests on top of the spring 105. The internal diameter of the sleeve 107 is selected to provide a sliding but close tolerance fit for receiving the shank 30. The semi-circular parts 84 and 86 are sized such as to fit intimately without binding the sleeve 107 and the nut portion 28 of the stud 20. The height of the block 100 is such that the punch members 76 and 78 are fully closed as shown and rest on the flat top of the block 100 as shown in FIG. 15.

As shown in FIGS. 11 through 16, all of the parts are so shaped and sized that the ball stud 20 of FIG. 1 may be inserted into the sleeve 107 with the nut portion 28 resting on top of the sleeve. The spring 105 and the sleeve 107, as well as the thicknesses of the punch members 76, 78, are so dimensioned that the stud 20 will assume the position shown in FIG. 15 with the coining edges 90 and 92 being slightly elevated above the stud neckline 26. Also, as is clearly shown in FIG. 15, the punch members 76, 78 solidly rest on the backing block 100 which in turn also solidly rests on the base plate 70. The significance of this solid mounting will become apparent from the description that follows.

For swinging the punch blocks 76 and 78 upwardly about their axes, two plungers 110 and 112 which are reciprocally received by the base plate 70 are used, the upper ends of these plungers 110, 112 engaging the undersides of the respective blocks 76, 78 for elevating the latter.

Reference may be had to FIGS. 11, 12, 13 and 15 for explaining the operation of the apparatus which has just been described. Referring to FIG. 11, the punch members 76 and 78 are first swung to their open positions corresponding to the dashed line position 76a. The dashed line shape 78a for the punch block 78 is illustrative of a partially opened position. A ball stud 20 is inserted into the sleeve 107 (FIGS. 14 and 15) until the nut portion 28 rests on the top edge of the sleeve 107. The punch blocks 76 and 78 are swung to their downward or closed positions as shown in FIGS. 11, 12 and 15, the semi-circular recesses 84 and 86 now surrounding the sleeve 107. The ball 34 projects above the punch members 76, 78 to the position shown in FIG. 14.

A body member 36 is now mounted on the ball 34 by fitting the socket 42 thereover and resting the body 36 in the nest portion 97 between the two sides 98 as shown more clearly in FIGS. 12, 13 and 15. The relationship between the nest portion 97 and the ball 34 is such that the body member 36 will be substantially horizontally aligned with the flat surface 40 thereof resting on the punch edges 92 and 94.

A ram 114 having a suitable, semi-circular cavity 116 is next positioned immediately above the body member 36 in vertical alignment with the ball 34. The cavity 116 is also aligned with the cylindrical shape of the body member 36. So positioned, the ram 114 is brought downwardly against the upper side of the body 36 to force the punch edges 92 and 94 against the flat surface 40. The punch edges 92 and 94 are preferably coplanar and substantially horizontal such that as the ram 114 forces the body 36 downwardly, the side 40 will flatten against these punch edges 92 and 94. Thus, the punch edges 92 and 94 are instrumental in locating properly the body member 36 just prior to the coining operation.

At this point, it should be explained that the height of the spring 105 (FIG. 15) is such that the circumferential flange 118 on the bottom end of the sleeve 107 is normally engaged with the annular shoulder 119 on the backing block when the ram 114 is retracted and spaced vertically from the body 36. Further, the length of the sleeve 107 is such that the ball 22 will be spaced higher, with respect to the punch blocks 76 and 78, than shown in FIG. 15. Explained differently, the flat surface 40 of body 36, when the latter is fitted over the ball 22 (FIG. 15) will be spaced normally a short distance (0.010", e.g.) above the punch edges 92, 94 by reason of the ball 22 being held upwardly by sleeve 107 and spring 105. Thus, first engagement of ram 114 with body 36 will result in movement of body 36 into contact with punch edges 92, 94. Spring 105 will be correspondingly compressed and flange 118 will be slightly separated from annular shoulder 119. This spring compression results from the stud 20 being moved downwardly against the sleeve 107 by the body 36. This action is important, because the ram force can never bottom against reaction from the stud 20 but only against the body 36 engaging the solid backing of the punch edges 92, 94.

After the initial engagement of the ram 114 with the body 36, further downward movement of the ram 114 will result in moving the punch blocks 76 and 78 downwardly until they flatten against the backing block 100.

As just stated, this results in depressing the stud 20 and compressing to a certain extent the spring 105, because the sleeve 107 is forced downwardly by the nut portion 28 of the ball stud and this sleeve 107 is in engagement with the upper end of the spring 105.

Further downward movement of the ram 114 causes the punch edges 92 and 94 to produce the indentations 58 and 60 (FIGS. 7, 8 and 9) previously described. These punch edges 92 and 94 produce the indentations 58 and 60 and coin the body metal inwardly against the ball 22 as a backing thereby completing the formation of the socket.

The ram 114 is retracted upwardly and the sleeve 107 is moved upwardly under the force of the spring 105. If the punch edges 92 and 94 should be stuck into the indentations formed into the body 36, the spring 105 breaks them apart. A slight clearance is provided between the flange 118 on the sleeve 107 and the shoulder 119 on the block 100 so that slight relative movement may be imparted to the body 36 with respect to the punch blocks 76 and 78.

Complete separation of the ram 114 from the body 36 permits the upward swinging of both punch blocks 76 and 78 and the removal of the assembled ball stud and body member from the sleeve 107.

In order to perform another operation, the procedure explained hereinabove is merely repeated.

With all the parts properly dimensioned as previously explained, the neck line 26, which is circular, defines a plane which is parallel and contiguous to but slightly above the flat side 40 when the stud axis is positioned coincident with the cavity axis 46. This being true, the ball stud may be swiveled in the socket 42, 52 to the dashed line positions 128 in FIG. 9 and 130 in FIG. 10, the flat surface 40 permitting this relatively large tilting angle. Thus, with the ball center 62 being positioned immediately adjacent to the body axis 38, the flat side 40 in cooperation with the other structural features described in the foregoing permit maximum tilting angles of the stud for given dimensions thereof. Also, maximum strength is provided in the joint assembly by positioning the ball center 62 as closely as possible to the body axis 38, and this may be explained as follows.

If it is assumed that the ball stud is positioned with its axis coincident with the cavity axis 46, and a force F applied as shown in FIG. 9 to the ball stud, a moment arm equal to the separation between the ball center 62 and the body axis 38 cooperates with this force in attempting to bend the body 36 about a point indicated by the numeral 132. The shorter this moment arm, the smaller is the bending moment at the point 132. Tests have actually proven that this design with the flat side 40 which permits deeper penetration of the ball 22 into the body member reduces this bending moment to such an extent that the strength of the joint assembly is vastly increased. The required tilting angles of the ball stud are increased also such that the desired functional attributes of the ball and socket are retained while an increase in strength thereof is achieved, all without adding to the sizes of the parts and strengths of the material used.

Since the indentations 58 and 60 coined into the flat side 40 are quite long, relatively speaking, the amount of metal which is coined inwardly against the ball 22 is correspondingly great. This adds to the strength of the assembly which resists withdrawal of the ball 22 from the socket as well as the wear-life of the socket inasmuch as there is more material in engagement with the ball which is available for wear.

It should be noted that the coining indentations 58 and 60 are formed on opposite sides of the cavity 42 spaced in the direction extending parallel to the body axis 38. Thus, the deformation of the socket metal is limited to the arcuate length of the indentations 58 and 60 transversely of the body 36. The opposite sides of the socket 42, 52 transversely of the body 36 are therefore not shaped or deformed by the coining operation, but instead retain original shapes as segments of a cylinder, the shape of this cylinder being that of the original cavity 42 as illustrated and described in connection with FIGS. 2 and 3.

In a typical design for a ball 22 of about .615 inch in diameter, the socket 42 is given a diameter of about .620 inch. In this instance, the diameter of the body is .749 inch with the minimum thickness of the body being about .683 inch. In an operating embodiment of this invention, the cavity axis 46 is positioned about .562 inch from the right-hand end of the body 36 as viewed in FIG. 4. Referring again to the dimensions of the ball stud of FIG. 1, the neck 26 has a diameter of about .375 inch. The depth of the cylindrical portion of the socket 42 as shown in FIGS. 4 and 5 coincides with a plane passing through the body which includes the axis 38 and is parallel to the flat side 40.

Obviously, these dimensions may be varied to suit design requirements without departing from the spirit and scope of this invention. As will now be appreciated, the fabrication of the ball joint assembly of this invention is materially simplified, among the reasons for this being the fact that in using the apparatus of FIGS. 11 through 16, proper location of both the body and stud are automatic in the process of performing the coining operation. With respect to the ball joint assembly itself, it has greater strength for withstanding shear and bending forces than any prior design, this increased strength being achieved without reducing the swivel angle of the stud or the wear-life of the joint.

Preferably, the transverse dimension of the body 36 taken between the flat surface 40 and the diametrically opposite portion of the body 36 is made equal to a standard wrench size so that the body can be held against rotation while a member is threaded into the threaded bore of the body 36 as shown in FIG. 4.

In the event it is desired to perform the aforedescribed coining operation against a ball 34 which is not hardened or harder than body 36, the ram 114 may be modified by providing depending flanges 134 shown in dashed lines in FIGS. 11 and 13. These flanges 134 are spaced apart a distance sufficient to straddle body 36 and the punch edges 92, 94 and are long enough to engage and bottom on the punch blocks 76, 78 when the coining indentations 58 and 60 have formed to the proper, predetermined depth. Thus, the metal of body 36 may be formed around the ball 22 without indenting the latter. The purpose of the flanges 134 is to limit the depth of the coining operation so as to prevent deforming forces from being applied to ball 22.

While there have been described above the principles of this invention in connection with specific apparatus, it is to be clearly understood that this description is made only by way of example and not as a limitation to the scope of the invention.

What is claimed is:

1. A ball joint assembly comprising a solid metallic body of part-cylindrical shape, said body having an axis coaxial with respect to the cylindrical portion thereof, said body having a flat side which lies in a plane parallel to said axis, the width dimension of said side lying between the lengths of a radius and a diameter of said cylindrical portion, a generally cylindrical socket in said body which opens through said flat side, said socket having a diameter greater than the width of said flat side so that it also opens through a region of said cylindrical portions, said socket having an axis normal to the plane of said flat side and to said body axis, the bottom of said socket being generally tapered to a point in two conical sections, the bottom section being of larger angle than the upper section, said bottom section being of a cross-sectional angle of approximately 135°, the upper section being of a cross-sectional angle of approximately 90°, a ball stud having a generally spherical hardened metal ball on one end and a shank portion on the other end, said stud having a neck and nut portion between the aforesaid ends, said neck being joined to said ball and to said nut portion, said neck being of smaller diameter than said ball at the joinder therebetween, said socket receiving said ball, the diameter of said ball being substantially equal to but smaller than the diameter of said socket, the center of said ball being disposed adjacent to the axis of said body but spaced therefrom in a direction toward said flat side, said body having portions extending radially inwardly of said socket, said body portions being disposed at the open end of said socket and having an arcuate extent longer than the width of said flat side, said body portions being on opposite sides of said ball in a direction axially of said body, said socket having opposed cylindrical sections transversely of said body and opposed generally spherical sections axially of said body, said body portions forming part of said spherical sections, a diameter extending between said cylindrical sections being substantially equal to but larger than a diameter of said ball, a diametral line in the plane of said flat side extending between said opposed spherical sections being smaller than said ball diameter, whereby said ball is retained in said socket, said ball engaging the aforesaid upper tapered section as a bearing, said neck defining a plane where it joins said ball which is contiguous to the plane of said flat side when said stud axis is coincident with said socket axis, whereby said ball may be universally swiveled in said socket.

2. The ball joint assembly of claim 1 wherein said flat side has two arcuate depressions therein on opposite sides of said socket axially of said body, said depressions being contiguous and substantially parallel to the perimeter of said socket, the body portions between said socket and said depressions being at a level closer to said body axis than said flat side, thereby accommodating a corresponding angular tilt of said ball stud in a direction parallel to said body axis.

3. A ball joint assembly comprising a solid metallic body of part-cylindrical shape, said body having an axis coaxial with respect to the cylindrical portion thereof, said body having a flat side which lies in a plane parallel to said axis, a generally cylindrical socket in said body which opens through said flat side, said socket having a diameter greater than the width of said flat side so that it also opens through a region of said cylindrical portions, said socket having an axis normal to the plane of said flat side and to said body axis, the bottom of said socket being generally tapered, a ball stud having a generally spherical hardened metal ball on one end and a shank portion on the other end, said stud having a neck and nut portion between the aforesaid ends, said neck being joined to said ball and to said nut portion, said neck being of smaller diameter than said ball at the joinder therebetween, said socket receiving said ball, the diameter of said ball being substantially equal to but smaller than the diameter of said socket, the center of said ball being disposed adjacent to the axis of said body but spaced therefrom in a direction toward said flat side, said body having portions extending radially inwardly of said socket, said body portions being disposed at the open end of said socket and having an arcuate extent longer than the width of said flat side, said body portions being on opposite sides of said ball in a direction axially of said body, said socket having opposed cylindrical sections transversely of said body and opposed generally spherical sections axially of said body, said body portions forming part of said spherical sections, a diameter extending between said cylindrical sections being substantially equal to but larger than a diameter of said ball, a diametral line extending between said opposed spherical sections parallel to said body axis and in the plane of said flat side being smaller than said ball diameter, whereby said ball is retained in said socket, said ball engaging the aforesaid tapered section as a bearing, said neck defining a plane where it joins said ball which is contiguous to the plane of said flat side when said stud axis is coincident with said socket axis, whereby said ball may be universally swiveled in said socket.

4. A ball joint assembly comprising a solid metallic body of part-cylindrical shape, said body having an axis coaxial with respect to the cylindrical portion thereof, said body having a flat side, a generally cylindrical socket in said body which opens through said flat side, said socket having an axis transverse to the plane of said flat side, a ball stud having a generally spherical metal ball on one end and a shank portion on the other end, said stud having a neck between the aforesaid ends, said neck being joined to said ball, said neck being of smaller diameter than said ball at the joinder therebetween, said socket receiving said ball, the diameter of said ball being substantially equal to but smaller than the diameter of said socket, the center of said ball being disposed adjacent to the axis of said body, said body having portions extending radially inwardly of said socket, said body portions being disposed at the open end of said socket and having an arcuate extent longer than the width of said flat side, said body portions being on opposite sides of said ball in a direction axially of said body, said socket having opposed cylindrical sections spaced transversely of said body and opposed generally spherical sections spaced axially of said body, said body portions forming part of said spherical sections, a diameter extending between said cylindrical sections being substantially equal to but larger than a diameter of said ball, a diametral line extending between said opposed spherical sections parallel to said body axis being shorter than said ball diameter, whereby said ball is retained in said socket.

5. A ball joint assembly comprising an elongated body having a longitudinal axis, a flat side on said body, a socket in said body having a top which opens through said side, a ball stud having a ball pivotally received by said socket, said socket on opposite sides thereof in a direction parallel to the longitudinal axis of said body being shaped to conform substantially to the contour of said ball whereby said ball is retained in said socket, the wall portions of said socket on opposite sides of said axis being part cylindrical in shape, said ball having a clearance with said socket whereby it may swivel therein, said socket opening through said flat side as well as a portion of the cylindrical surface, and said ball having a neck portion defining a plane where it joins said ball which is immediately adjacent to the plane of said flat side when said stud is centered in said socket.

6. A ball joint assembly comprising an elongated body having a longitudinal axis, a flat side on said body, a socket in said body having a mouth which opens through said side, a ball stud having a ball pivotally received by said socket, said socket on opposite sides thereof in a direction along the longitudinal axis of said body being shaped to conform substantially to the contour of said ball whereby said ball is retained in said socket, the wall portions of said socket on opposite sides of said axis being part cylindrical in shape, said first-mentioned opposite sides including portions of said body which define opposite portions of the mouth of said socket spaced apart a distance shorter than the diameter of said ball, said mouth portions being disposed entirely beneath the plane of said flat side, said ball having a clearance with said socket whereby it may swivel therein, and said ball stud having a terminal neck portion lying in a plane where it joins said ball which plane is substantially coextensive with the plane of said flat side when said stud is centered in said socket.

References Cited
UNITED STATES PATENTS

| | | | |
|---|---|---|---|
| 576,500 | 2/1897 | Strauss | 308—201 |
| 3,253,845 | 5/1966 | Davies. | |
| 3,288,501 | 11/1966 | Ross et al. | |

DAVID J. WILLIAMOWSKY, Primary Examiner

A. V. KUNDRAT, Assistant Examiner